Figures 3, 4:
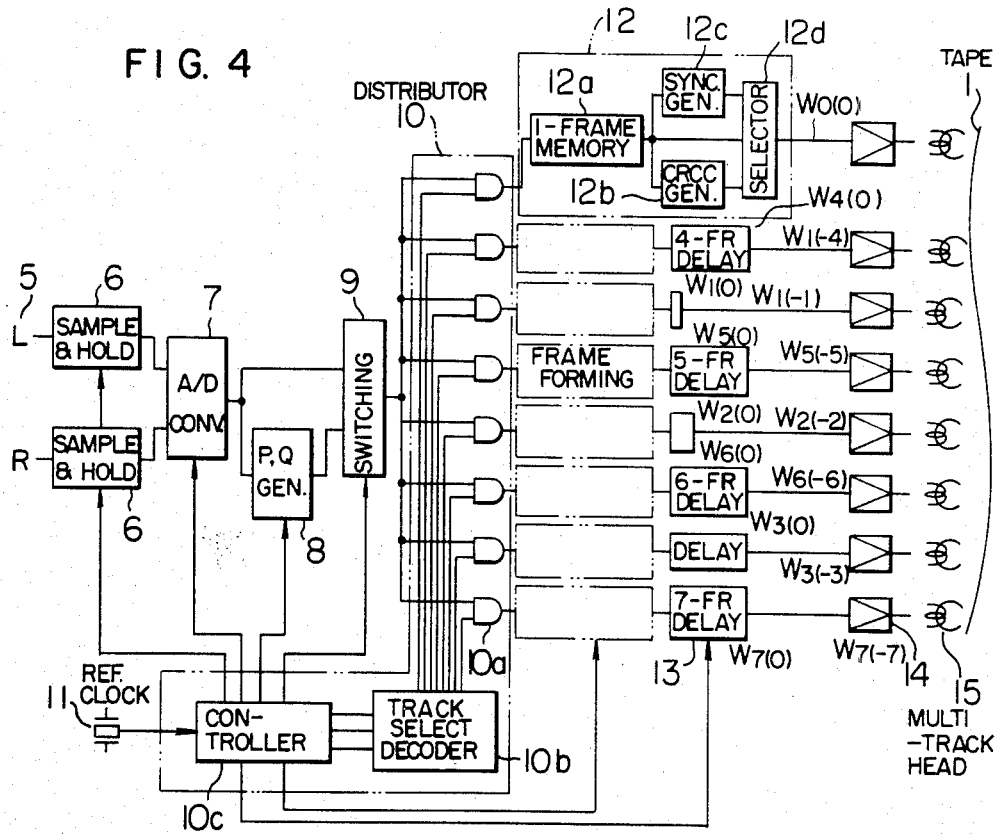

United States Patent [19]

Hoshino et al.

[11] Patent Number: 4,539,605
[45] Date of Patent: Sep. 3, 1985

[54] PCM TAPE RECORDING AND REPRODUCING APPARATUS HAVING A DROPOUT-IMMUNE DATA RECORDING FORMAT

[75] Inventors: Takashi Hoshino, Fujisawa; Takao Arai; Keizo Nishimura, both of Yokohama, all of Japan

[73] Assignee: Hitachi, Ltd., Tokyo, Japan

[21] Appl. No.: 416,244

[22] Filed: Sep. 9, 1982

[30] Foreign Application Priority Data

Sep. 11, 1981 [JP] Japan .............................. 56-142292

[51] Int. Cl.³ .......................... G11B 5/00; G11B 5/09
[52] U.S. Cl. ........................................ 360/32; 360/48
[58] Field of Search .................................... 360/32, 48

[56] References Cited

U.S. PATENT DOCUMENTS

| 4,277,807 | 7/1981 | Baldwin | 360/48 |
| 4,403,261 | 9/1983 | Tanaka | 360/32 |
| 4,403,263 | 9/1983 | Kageyame et al. | 360/32 |
| 4,433,415 | 2/1984 | Kojima | 360/32 |

FOREIGN PATENT DOCUMENTS 2061575  5/1981  United Kingdom ................. 360/32

OTHER PUBLICATIONS

"Twined Interleaving of Data on a Multitrack Storage Medium", by A. M. Patel, IBM, TDB, vol. 18, #8, Jan. 76.

Primary Examiner—Vincent P. Canney
Attorney, Agent, or Firm—Antonelli, Terry & Wands

[57] ABSTRACT

A PCM tape recording and reproducing apparatus for recording and reproducing an audio signal by using multitrack heads, comprises a frame interleaving device with a high dropout immunity function. The frame interleaving device comprises a distributor for successively distributing continuous interleaved input data between tracks, wihtin a multiplicity of tracks formed by splitting a magnetic tape, at a spacing of at least one track so that said continuous interleaved input data will not be shared between two continuous tracks in the same recording and reproducing direction, a data framing circuit for forming a frame out of data to be distributed to each of said tracks and for applying said frame with a synchronization signal at the top of said frame and with an error detection code at the end of said frame, and a delay circuit for delaying data associated with a track by one frame or more with respect to data associated with a neighboring track in the same recording and reproducing as said track.

3 Claims, 9 Drawing Figures

FIG. 1 PRIOR ART

MULTI-TRACK DATA FORMAT

| TRACK | | | | FRAME 1 | | | | | |
|---|---|---|---|---|---|---|---|---|---|
| 101 | $W_0(0)$ | $W_0(1)$ | $W_0(2)$ | $W_0(3)$ | $W_0(4)$ | $W_0(5)$ | $W_0(6)$ | $W_0(7)$ |
| 102 | $W_1(0)$ | $W_1(1)$ | $W_1(2)$ | $W_1(3)$ | $W_1(4)$ | $W_1(5)$ | $W_1(6)$ | $W_1(7)$ |
| 103 | $W_2(0)$ | $W_2(1)$ | $W_2(2)$ | $W_2(3)$ | $W_2(4)$ | $W_2(5)$ | $W_2(6)$ | $W_2(7)$ |
| 104 | $W_3(0)$ | $W_3(1)$ | $W_3(2)$ | $W_3(3)$ | $W_3(4)$ | $W_3(5)$ | $W_3(6)$ | $W_3(7)$ |
| 105 | $W_4(0)$ | $W_4(1)$ | $W_4(2)$ | $W_4(3)$ | $W_4(4)$ | $W_4(5)$ | $W_4(6)$ | $W_4(7)$ |
| 106 | $W_5(0)$ | $W_5(1)$ | $W_5(2)$ | $W_5(3)$ | $W_5(4)$ | $W_5(5)$ | $W_5(6)$ | $W_5(7)$ |
| 107 | $W_6(0)$ | $W_6(1)$ | $W_6(2)$ | $W_6(3)$ | $W_6(4)$ | $W_6(5)$ | $W_6(6)$ | $W_6(7)$ |
| 108 | $W_7(0)$ | $W_7(1)$ | $W_7(2)$ | $W_7(3)$ | $W_7(4)$ | $W_7(5)$ | $W_7(6)$ | $W_7(7)$ |

FIG. 2 PRIOR ART

FRAME FORMATS

| | 2 | 3 | | | | | | | 4 |
|---|---|---|---|---|---|---|---|---|---|
| $W_0(0)$ | SYNC | $L_0$ | $L_3$ | $L_6$ | $L_9$ | $L_{12}$ | $L_{15}$ | $L_{18}$ | $L_{21}$ | CRCC |
| $W_1(0)$ | SYNC | $R_0$ | $R_3$ | $R_6$ | $R_9$ | $R_{12}$ | $R_{15}$ | $R_{18}$ | $R_{21}$ | CRCC |
| $W_2(0)$ | SYNC | $L_1$ | $L_4$ | $L_7$ | $L_{10}$ | $L_{13}$ | $L_{16}$ | $L_{19}$ | $L_{22}$ | CRCC |
| $W_3(0)$ | SYNC | $R_1$ | $R_4$ | $R_7$ | $R_{10}$ | $R_{13}$ | $R_{16}$ | $R_{19}$ | $R_{22}$ | CRCC |
| $W_4(0)$ | SYNC | $L_2$ | $L_5$ | $L_8$ | $L_{11}$ | $L_{14}$ | $L_{17}$ | $L_{20}$ | $L_{23}$ | CRCC |
| $W_5(0)$ | SYNC | $R_2$ | $R_5$ | $R_8$ | $R_{11}$ | $R_{14}$ | $R_{17}$ | $R_{20}$ | $R_{23}$ | CRCC |
| $W_6(0)$ | SYNC | $P_0$ | $P_3$ | $P_6$ | $P_9$ | $P_{12}$ | $P_{15}$ | $P_{18}$ | $P_{21}$ | CRCC |
| $W_7(0)$ | SYNC | $Q_0$ | $Q_3$ | $Q_6$ | $Q_9$ | $Q_{12}$ | $Q_{15}$ | $Q_{18}$ | $Q_{21}$ | CRCC |

| TRACK |  |  |  |  |  |  |  |  |
|---|---|---|---|---|---|---|---|---|
| 101 | $W_0(0)$ | $W_0(1)$ | $W_0(2)$ | $W_0(3)$ | $W_0(4)$ | $W_0(5)$ | $W_0(6)$ | $W_0(7)$ |
| 102 | $W_4(-4)$ | $W_4(-3)$ | $W_4(-2)$ | $W_4(-1)$ | $W_4(0)$ | $W_4(1)$ | $W_4(2)$ | $W_4(3)$ |
| 103 | $W_1(-1)$ | $W_1(0)$ | $W_1(1)$ | $W_1(2)$ | $W_1(3)$ | $W_1(4)$ | $W_1(5)$ | $W_1(6)$ |
| 104 | $W_5(-5)$ | $W_5(-4)$ | $W_5(-3)$ | $W_5(-2)$ | $W_5(-1)$ | $W_5(0)$ | $W_5(1)$ | $W_5(2)$ |
| 105 | $W_2(-2)$ | $W_2(-1)$ | $W_2(0)$ | $W_2(1)$ | $W_2(2)$ | $W_2(3)$ | $W_2(4)$ | $W_2(5)$ |
| 106 | $W_6(-6)$ | $W_6(-5)$ | $W_6(-4)$ | $W_6(-3)$ | $W_6(-2)$ | $W_6(-1)$ | $W_6(0)$ | $W_6(1)$ |
| 107 | $W_3(-3)$ | $W_3(-2)$ | $W_3(-1)$ | $W_3(0)$ | $W_3(1)$ | $W_3(2)$ | $W_3(3)$ | $W_3(4)$ |
| 108 | $W_7(-7)$ | $W_7(-6)$ | $W_7(-5)$ | $W_7(-4)$ | $W_7(-3)$ | $W_7(-2)$ | $W_7(-1)$ | $W_7(0)$ |

MULTI-TRACK DATA FORMAT

FIG. 5

FIG. 6

| | | | 3 | | 14-WORD DATA | | 4 |
|---|---|---|---|---|---|---|---|
| W₁ | SYNC | $L_n$ | $L_{6+n}$ | $L_{12+n}$ | --- | --- | $L_{78+n}$ | CRCC |
| W₂ | SYNC | $R_n$ | $R_{6+n}$ | $R_{12+n}$ | --- | --- | $R_{78+n}$ | CRCC |
| W₃ | SYNC | $L_{n+1}$ | $L_{6+n+1}$ | $L_{12+n+1}$ | --- | --- | $L_{78+n+1}$ | CRCC |
| W₄ | SYNC | $R_{n+1}$ | $R_{6+n+1}$ | $R_{12+n+1}$ | --- | --- | $R_{78+n+1}$ | CRCC |
| W₅ | SYNC | $L_{n+2}$ | $L_{6+n+2}$ | $L_{12+n+2}$ | --- | --- | $L_{78+n+2}$ | CRCC |
| W₆ | SYNC | $R_{n+2}$ | $R_{6+n+2}$ | $R_{12+n+2}$ | --- | --- | $R_{78+n+2}$ | CRCC |
| W₇ | SYNC | $L_{n+3}$ | $L_{6+n+3}$ | $L_{12+n+3}$ | --- | --- | $L_{78+n+3}$ | CRCC |
| W₈ | SYNC | $R_{n+3}$ | $R_{6+n+3}$ | $R_{12+n+3}$ | --- | --- | $R_{78+n+3}$ | CRCC |
| W₉ | SYNC | $L_{n+4}$ | $L_{6+n+4}$ | $L_{12+n+4}$ | --- | --- | $L_{78+n+4}$ | CRCC |
| W₁₀ | SYNC | $R_{n+4}$ | $R_{6+n+4}$ | $R_{12+n+4}$ | --- | --- | $R_{78+n+4}$ | CRCC |
| W₁₁ | SYNC | $L_{n+5}$ | $L_{6+n+5}$ | $L_{12+n+5}$ | --- | --- | $L_{78+n+5}$ | CRCC |
| W₁₂ | SYNC | $R_{n+5}$ | $R_{6+n+5}$ | $R_{12+n+5}$ | --- | --- | $R_{78+n+5}$ | CRCC |
| W₁₃ | SYNC | $P_n$ | $P_{6+n}$ | $P_{12+n}$ | --- | --- | $P_{78+n}$ | CRCC |
| W₁₄ | SYNC | $Q_n$ | $Q_{6+n}$ | $Q_{12+n}$ | --- | --- | $Q_{78+n}$ | CRCC |

PCM TAPE RECORDING AND REPRODUCING APPARATUS HAVING A DROPOUT-IMMUNE DATA RECORDING FORMAT

The present invention generally relates to a PCM tape recording and reproducing apparatus which converts an analog signal to a digital code, records the digital code in a data recording format having high dropout immunity and reproduces the recorded signal.

A PCM tape recorder which records an audio signal after converting it to a digital code and reproduces the digital code to restore it to the original audio signal is affected by the characteristics of the magnetic tape or mechanical running mechanism in use to a lesser degree as compared with the conventional analog-scheme tape recorder, thus a high quality of sound is being reproduced by the digital system.

Because of its higher recording density on the tape as compared to that of the analog scheme, however, PCM tape recorder is greatly affected by the dropout caused by dust, a flaw in the tape etc. If the dropout produces an error in the reproduced data, an abnormal sound is generated. Accordingly, it is important to prevent the bad influence due to such dropouts in a PCM tape recorder.

Therefore, it is common to record an error detection word, such as a cyclic redundancy check code (CRCC), for each transmission frame at the time of recording data onto the magnetic tape and to determine whether the data in each data frame or data block is correct or not by using the CRCC at the time of reproduction. One of the correction methods for a data block which has been found to be erroneous is the preceding value holding system of zeroth order approximation wherein the erroneous data block is replaced by the preceding data. Another correction method uses the mean value interpolation system of the first order approximation wherein the erroneous data block is replaced by the mean value of data before and after the block. These methods serve to prevent abnormal sound. Further, there is a method wherein an error correction word such as a parity bit is recorded at the time of data recording and erroneous data is corrected by using this error correction word to restore its original correct data.

Even if such a means is employed, however, should consecutive errors occur in the reproduced data due to a dropout over a large area on the tape, several identical data continue in the preceding value holding system and the error correction operation cannot be accomplished due to errors beyond the capability in the mean value interpolation technique.

As a matter of course, correction is not performed if produced errors exceed the ability of the correction system. Thus, even if a compensation or correction system is employed, it is necessary to devise the system configuration so that the ability of the compensation or correction system may be fully utilized.

FIG. 1 shows an example of a data recording format on a PCM tape recorder of a multi-track head type. The magnetic tape 1 is divided into a plurality of tracks, on which data obtained from an audio signal subjected to analog-to-digital (A/D) conversion have been recorded by using the interleaving technique. In FIG. 1, $W_o(o)$ to $W_7(7)$ denote data frames on tracks 101 to 108. As shown in FIG. 2, each frame includes a frame synchronization signal (SYNC) 2, data for an audio signal 3, and an error detection code (CRCC) 4. In FIG. 2, $L_o$, $L_1$, $L_2$, $L_3$, . . . are continuous data words of the left (L) channel and $R_o$, $R_1$, $R_2$, $R_3$, . . . are continuous data words of the right (R) channel. Each of these data words $L_o$, $L_1$, $L_2$, . . . , $R_o$, $R_1$, $R_2$, . . . is composed of, say, 14 bits. Frames $W_6(o)$ and $W_7(7)$ are redundancy frames for error correction. $P_o$ and $Q_o$ are error correction words which have been generated for six data words $L_o$, $R_o$, $L_1$, $R_1$, $L_2$ and $R_2$ on the first column word block. Thereby, errors of up to 2 data words within 6 data words can be corrected. $P_3$ and $Q_3$ on the second column word block function in the similar manner. When the magnetic tape on which data is recorded in such a format has been reproduced, the following operation is carried out. At the time of reproducing the data from the tape, successive data frames $W_o$ to $W_7$ as a group are read out of the tape at one time and the following columns are successively processed. If an error has occurred due to a dropout on the tape, the error is detected by using the error detection code (CRCC) and all the data within that frame is regarded as erroneous data. Subsequently, error correction is carried out by using the data on this erroneous frame and data on other track frames in the same column. In the example illustrated in FIG. 2, error correction is made by using six column words and two error correction words P and Q corresponding to these six words. Such error correction is carried out for each of the columns respectively containing $L_o$, $L_3$, . . . , $L_{21}$, that is to say, eight sets of error correction are carried out for one frame. As an example of 8 sets of correction blocks, an operation of the correction block consisting of $L_o$, $R_o$, $L_1$, $R_1$, $L_2$, $R_2$, $P_o$ and $Q_o$ will be explained in the following. Other correction blocks operate in the same way. For example, when the frame $W_2(o)$ on the track 103 is erroneous, that is to say, $L_1$ is erroneous, it is corrected by using five correct data words, $L_o$, $R_o$, $R_1$, $L_2$ and $R_2$ and correction words $P_o$ and $Q_o$. In the case where frames $W_2(o)$ and $W_3(o)$ are erroneous, namely two data words $L_1$ and $R_1$ are erroneous, they can also be corrected in the same manner by using four correct data as well as $P_o$ and $Q_o$. However, if frames $W_2(o)$, $W_3(o)$ and $W_4(o)$ are erroneous, namely, three data $L_1$, $R_1$ and $L_2$ are erroneous, correction cannot be accomplished. Therefore, in such a case, the mean value interpolation or preceding value holding technique must be employed. As for the $R_2$, the data $R_o$ and $R_1$ which are placed before and after $R_1$ are correct so that the mean value interpolation may be applied. However, $L_1$ and $L_2$ are continuous data so that the mean value interpolation technique may not be applied. Accordingly, the value of $L_o$ must be held as the preceding value. This results in three consecutive identical data values. Further more errors bring about the same problem. Thus, errors exceeding the correction ability result in the deteriorated tone quality. Such errors can be prevented by determining the distance between tracks so that the usually possible dropout may not cause errors on three data words or more, i.e. three frames or more. When the tape width is fixed, however, this reduces the number of tracks. Accordingly, it is also necessary to increase the recording density in the travelling direction or to lower the transmission rate of the system. Since these items are determined by the physical limitations deviating from the theory on the recording method and the system applications, in many cases it is impossible to alter items such as the number of tracks. After all, it has been impossible to realize the configuration fully withstanding the dropout. There is also another technique wherein the concentrated data destruction due to dropout is prevented by providing a phase shift between the synchronization signals for frames on adjacent tracks, i.e. by sequentially delaying the synchronization signals of the continuous data frames in an overlapped relation on the multi-track. This technique has failed to realize a satisfactory result similarly as those aforementioned.

Therefore, an object of the present invention is to provide a PCM tape recording and reproducing apparatus having enhanced dropout immunity.

Another object of the present invention is to provide a multi-track head PCM tape recorder having data and frame interleave functions wherein information frames including data and correction words are distributed to be recorded so that a series of information frames may not be contiguous to each other over recording tracks of the tape.

Figure 7:
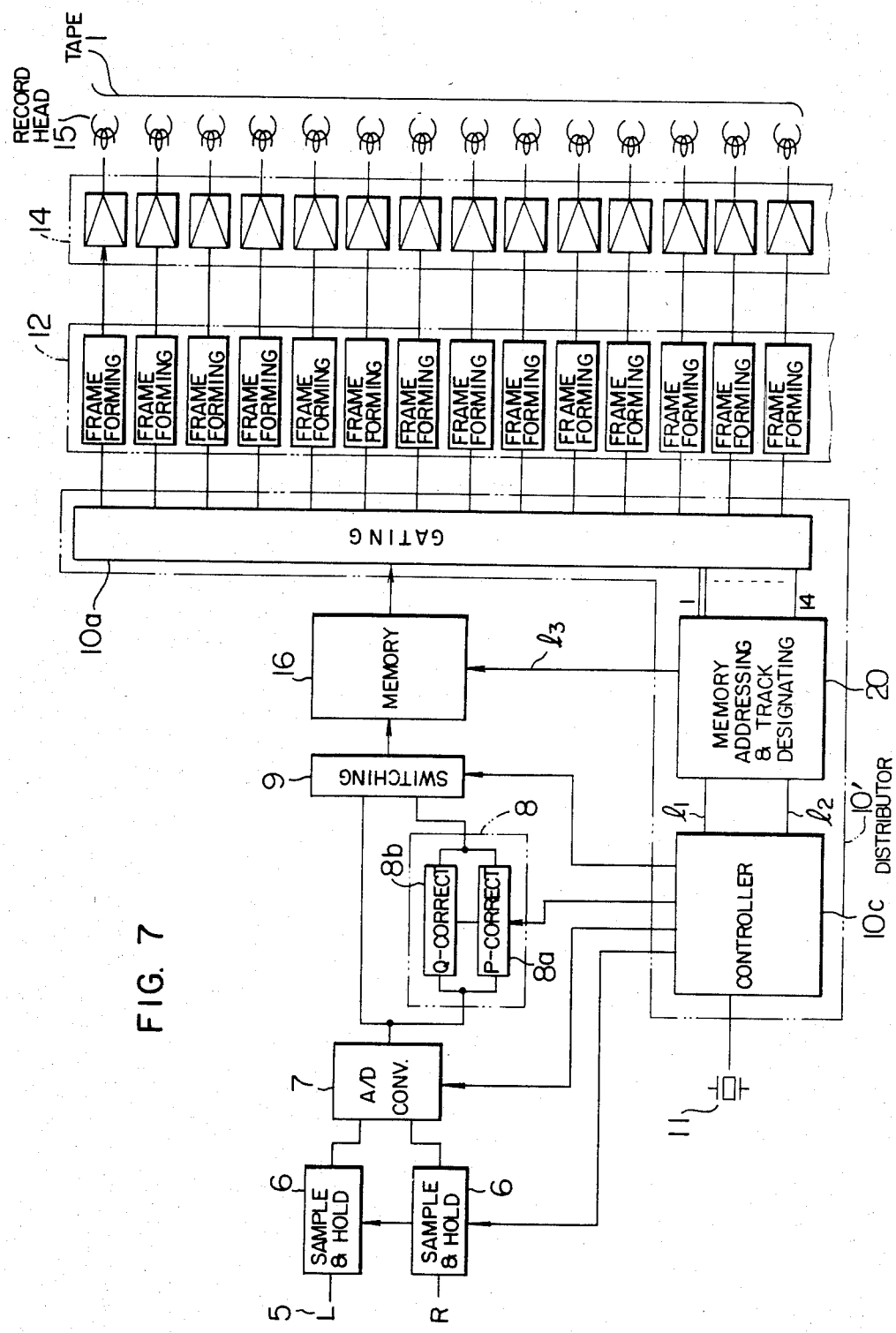
Figure 8:
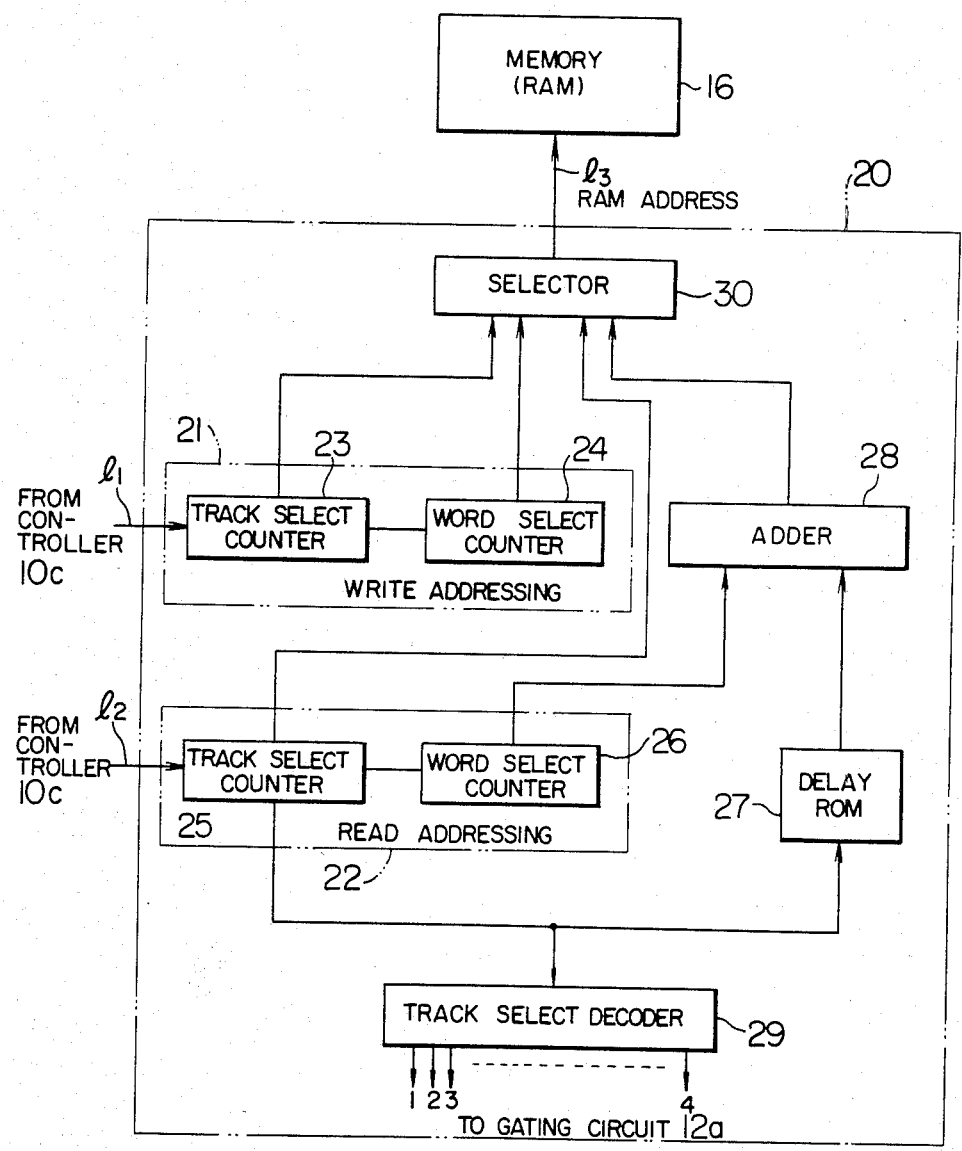
Figure 9:
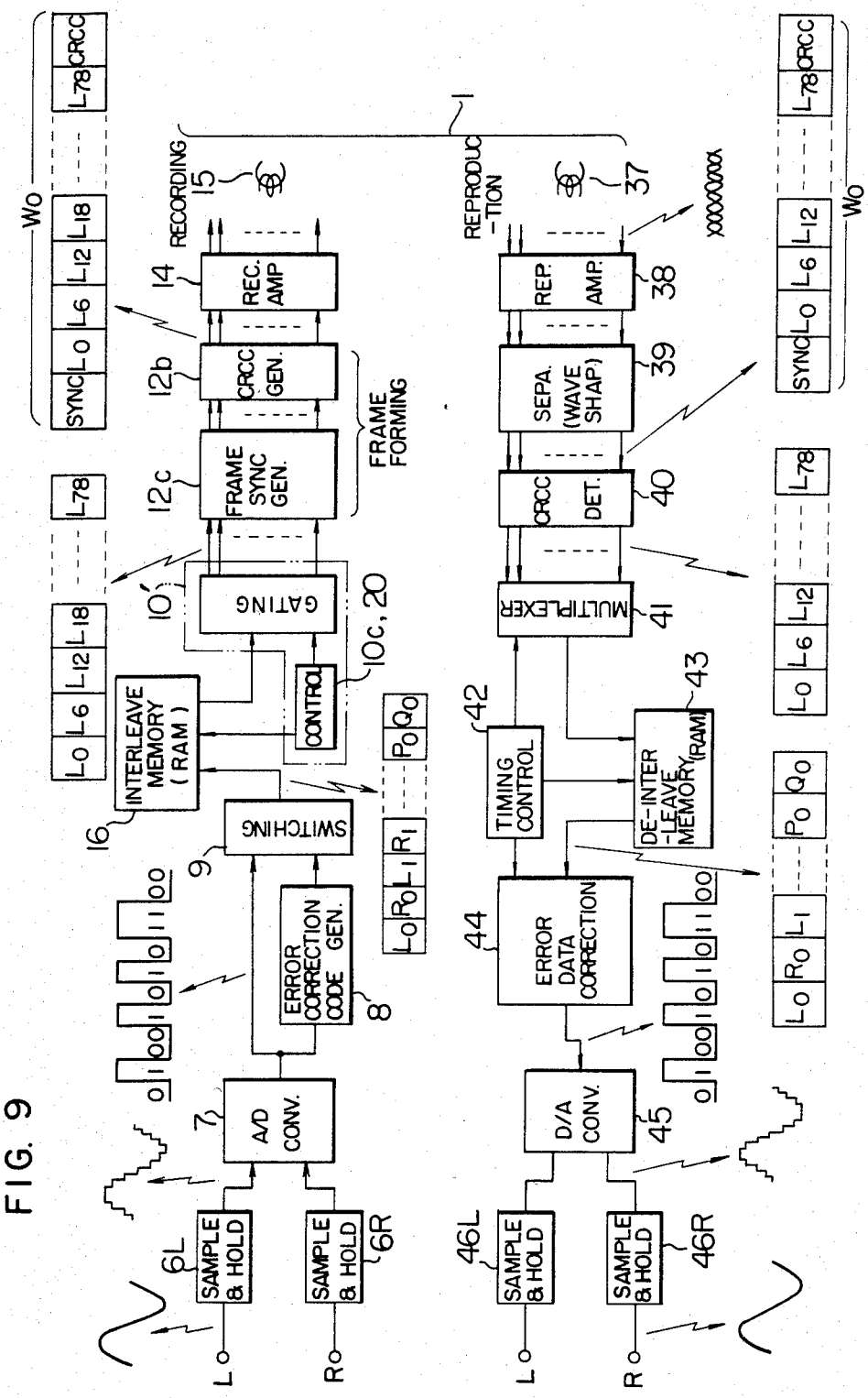

Preferred embodiments of the present invention will be described in conjunction with the accompanying drawings, in which:

FIG. 1 shows an example of a recording format in a conventional multi-track PCM recorder, FIG. 2 shows an example of frame compositions or frame formats in the recording format of FIG. 1, FIG. 3 shows an embodiment of a tape recording format according to the present invention, FIG. 4 shows a block diagram of a recording circuit for realizing the recording format shown in FIG. 3, FIG. 5 shows another embodiment of recording format according to the present invention, FIG. 6 shows an example of frame compensation in the recording format shown in FIG. 5, FIG. 7 shows a block diagram of the circuit for realizing the recording format shown in FIG. 5 and the frame composition shown in FIG. 6, FIG. 8 shows a block diagram of an example of a memory addressing and track designating circuit, and FIG. 9 shows an entire block diagram of a multi-track PCM tape recording and reproducing apparatus.

Reference is now made to FIG. 3 in which there is shown a multi-track recording format on the tape for an embodiment of the present invention. Here, data frames $W_o$ to $W_7$ corresponding to consecutive data of stereo channels each have the same conventional recording format shown in FIG. 2. In FIG. 3, with respect to a frame $W_0(o)$ position on the track, a frame $W_1(o)$ is recorded at one track interval and with one frame delay in the tape travelling direction. Similarly, a frame $W_2(o)$ is recorded at one track interval and with one frame delay with respect to the frame $W_2(o)$. A frame $W_3(o)$ is recorded in the same relative position with the frame $W_2(o)$. A frame $W_4(o)$ is recorded with one frame delay with respect to frame $W_3(o)$ and on a track 102 between the tracks for the frame $W_0(o)$ and frame $W_1(o)$. A frame $W_5(o)$ is recorded with one frame delay as compared with the frame $W_4(o)$ and on the track 104 between the tracks for $W_1$ frames and $W_2$ frames. Frames $W_6(o)$ and $W_7(o)$ are recorded in the similar manner.

Locations of $W_o(o)$ to $W_7(o)$ are indicated with blocks dipicted by thick lines in FIG. 3 only for easy understanding. Owing to such stairlike arrangement with a track apart, for example, concurrent errors on two frames among $W_1(o)$ to $W_7(o)$ occur only for a dropout which is 4 frames long by 2 tracks wide or a dropout which is 2 frames long by 3 tracks wide. As a result, concentrated dropout occurrence on a continuous data string is greatly reduced. Simultaneous errors on three frames resulting in consecutive data errors, for example, simultaneous errors on $W_1(o)$, $W_2(o)$ and $W_3(o)$ frames occur only for the dropout which is 3 frames long by 5 tracks wide. However, considering the tape width, the width of such dropout is larger than half that of the tape. The dropout of such a size does not usually appear frequently. As a result, consecutive data errors almost do not occur at all. If the dropout with a length of 3 frames should happen, the zeroth order or the first order interpolation is usually carried out. However, it should be noted that such compensation function is constantly intended to be reduced as far as possible in the PCM recording and reproducing technique.

FIG. 4 shows a block diagram of a tape recording circuit for carrying out the recording format shown in FIG. 3. The input analog data representing an audio signal 5 such as stereo channel signals L and R is sampled by a sample and hold circuit 6 at an interval of the sampling period. An A/D converter 7 converts the sampled analog data on the left channel (L) or the right channel (R) alternately into a digital signal. This digital signal is applied to a correction code generating circuit 8 to generate the P code and Q code usually called parity bits. The correction codes and the above-described digital signal are changed over by a switching circuit 9 to be applied to a distributor circuit 10. AND gates 10a are provided corresponding to the respective output lines of the distributor circuit 10. When the signal line connected to a track selection decoder 10b turns to a logical high level "H", an input signal passes through AND gates 10a and appears at the output of the AND gates. An output signal of the track selection decoder 10b designates a tape track to which the input signal is to be fed in a frame unit. The track selection decoder 10b operates depending upon the signal from a controller circuit 10c. The controller circuit 10c counts reference clocks generated by a crystal oscillator 11 to produce a sample and hold signal, A/D conversion signal, correction code generating signal, track selection signal for the distributor circuit and to control the frame generating circuit and delay circuit. The controller circuit 10c comprises counters and gate combination circuit. Each output line of the distributor circuit 10 is connected to the input of a frame forming circuit 12 provided for each track. In the frame forming circuit 12, the frame synchronization signal (SYNC) 2 and the error detection code (CRCC) 4 are added to the input data respectively by a frame synchronization signal generating circuit 12c and a CRCC generating circuit 12b. The input signal to a frame forming circuit 12 is stored in the frame memory 12a at first. At the data output timing point after all of eight data for one frame been stored, a frame synchronization signal is outputted first by the frame synchronization signal generating circuit 12c, subsequently data from the frame memory 12a is outputted, and lastly the error detection code from the error detection code (CRCC) generating circuit 12b is outputted. Since one of these three kinds of signals is selected by a data selector 12d, the output of the frame forming circuit 12 develops as a continuous data string in the frame format as represented by $W_o$, for example, shown in FIG. 2. The frame signals thus generated subsequently undergo a specified delay in a delay circuit 13. Assuming the data frame $W_o$ as a reference point on a time basis in the present embodiment, the data frames $W_o$, $W_1$, $W_2$, $W_3$, $W_4$, $W_5$, $W_6$ and $W_7$ are delayed respectively by 0, 1, 2, 3, 4, 5, 6 and 7 frames under the control of the controller circuit 10c. As the delay element, a shift register or memory is used because the signal is in digital form. The signal thus provided with a specified delay and arranged in the format illustrated in FIG. 3 is converted into a prescribed recording waveform by a well-known recording amplifier 14 and thereafter recorded onto the magnetic tape 1 by a fixed multi-track head 15. The data included in each frame may, of course, be subjected to a known data interleave operation in the frame forming.

In the following, another preferred embodiment according to the present invention, which is suitable for even more tracks, will be described. The basic concept of this embodiment is as follows. If all frames of the continuous data are to be delayed frame by frame, an elaborate and complicated hardware constitution is required. On the other hand, if the frames are placed intermittently in the width direction of the tape track, an effective space can be ensured between adjacent frames. FIG. 5 shows an example of a data recording format in which the magnetic tape is divided into 14 tracks. In FIG. 5, $W_1(m)$ to $W_{14}(m)$ ($m=0, 1, 2...$) are data frames assigned to respective tracks. As shown in FIG. 6, one frame is composed of the frame synchronization signal 2, 14-word data 3, and CRCC 4. Here, $L_n$, $L_{n+1}$, $L_{n+2}$, ... are continuous data words of the left channel and $R_n$, $R_{n+1}$, $R_{n+2}$, ... represent continuous data words of the right channel. $P_n$ recorded in $W_{13}$ frame and $Q_n$ recorded in $W_{14}$ frame are error correction codes and are generated by the following equations.

$$P_n = L_n \oplus R_n \oplus L_{n+1} \oplus R_{n+1} \oplus L_{n+2} \oplus R_{n+2} \oplus L_{n+3} \oplus R_{n+3} \oplus L_{n+4} \oplus R_{n+4} \oplus L_{n+5} \oplus R_{n+5},$$

$$Q_n = T^{12} \cdot L_n \oplus T^{11} \cdot R_n \oplus T^{10} \cdot L_{n+1} \oplus T^9 \cdot R_{n+1} \oplus T^8 \cdot L_{n+2} \oplus T^7 \cdot R_{n+2} \oplus T^6 \cdot L_{n+3} \oplus T^5 \cdot R_{n+3} \oplus T^4 \cdot L_{n+4} \oplus T^3 \cdot R_{n+4} \oplus T^2 \cdot L_{n+5} \oplus T \cdot R_{n+5},$$

where the $\oplus$ symbol indicates adding each bit of the word on the left to the corresponding bit of the word on the right in modulo 2 (binary addition without a carry) and T is a matrix having specified elements.

In this way, two error correction codes are added for each column word block composed of such as $L_n$, $R_n$, ..., $L_{n+5}$, $R_{n+5}$. Accordingly, errors up to 2 data words can be corrected within a so-called error correction block. In the case where one word, say $W_n(o)$ is erroneous in the recording format of FIG. 5, the simultaneous occurrence of another data resulting in errors of two words is caused only by the dropout which is 4 tracks long in the width direction and 8 frames long in the tape travelling direction. Errors of three words which cannot be corrected occur only for the dropout which is 7 tracks long in the width direction and 15 frames long in the travelling direction. The dropout occurring when the record on the magnetic tape is actually reproduced has not a linear shape in the width or tape travelling direction but has an area. Viewing the dropout from the aspect of its area, the dropout with an area of 4 tracks in the width direction and 7 frames in the travelling direction or the dropout with an area of 3 tracks in the width direction and 8 frames in the travelling direction causes only two erroneous words which can be corrected. The larger dropout causes three erroneous words which cannot be corrected. However, even if $W_7(0)$, $W_8(0)$ and $W_{12}(0)$, for example, are concurrently erroneous, errors exist in words $L_3$, $R_3$, $R_5$, $L_9$, $R_9$, $L_{11}$, ... $L_{81}$, $R_{81}$ and $L_{87}$ when viewing from the aspect of data word units. Neither of them are continuous errors. This is true of other error combinations in neighboring frames. Therefore, the erroneous data word can be approximately compensated by using the aforementioned mean value interpolation technique. As a result, the reproduced tone quality is not so seriously affected.

For preventing such errors which cannot be corrected, it is an effective countermeasure to locate the frames containing the continuous data at some intervals in the width and tape travelling directions. However, there is not a large degree of freedom in the dispersion of frames in the width direction under restraint from the tape width, the number of tracks determined by the travelling speed or transmission density, etc. On the other hand, dispersion of frames using delays in the travelling direction can be arbitrarily determined. However, a longer delay results in a larger circuit size of a shift register or memory making the delay. Therefore, it is necessary to optimize the amount of delay. In addition, it is also necessary to optimize the distance between the continuous frames in the tape width direction. As stated before, dust is known to be approximately several hundred micrometers in diameter and the actual dropout has such an area and is usually deemed to be circular. Therefore, the most effective arrangement is realized by selecting a spaced distance in the width direction between adjacent frames of successive numbers containing continuous data so that it will be equal to the delay amount between one frame and another frame spaced therefrom in the tape travelling direction and constituting one consecutive frame block together with the former frame. In an example illustrated in FIG. 5, the track width is 200 μm including a guard band of 100 μm and the length of one frame is 80 to 90 μm. Namely, the aspect ratio is 2:0.9. Accordingly, the frames have been placed at intervals of 3 tracks in the tape width direction and a delay of 7 frames have been provided in the travelling direction so that the shape defined by the frames of successive numbers may be nearly a square.

FIG. 7 shows an example of circuit arrangement for recording data in the format shown in FIG. 5 and the frame composition shown in FIG. 6. In FIG. 7 circuit components identical to those in FIG. 4 are designated by the same reference numerals. The input analog signal 5 is sampled by the sample and hold circuit 6 at an interval of sampling period. The A/D converter 7 converts the sampled analog data on the left and right channels alternately into a digital signal. The digital signal is applied to the correction code generating circuit 8. A P-correction code generating circuit 8a includes Exclusive-OR gates and latches to generate a P code. A Q-correction code generating circuit 8b includes Exclusive-OR gates and shift registers to generate a Q code. The correction codes thus generated and the output digital data from the A/D converter 7 are changed over by the switching circuit 9 to be stored into a memory 16. The data thus stored in the memory 16 is read out after a specified delay time to be distributed to a designated track by a distributor circuit 10'. The data distributed to each track is supplied with a frame synchronization signal 2 and an error detection code 4 by the frame forming circuit 12 which has the same function as that shown in FIG. 4, converted into a prescribed recording waveform by the recording amplifier 14, and recorded on the magnetic tape 1 by the recording multi-head 15.

Differing from FIG. 4, in this embodiment, the delays for respective tracks are provided collectively by one unit of memory 16 without using individual delay elements or circuits. The data corresponding to frames $W_1$, $W_2$, $W_3$, $W_4$ and $W_5$ is read out of the memory 16 concurrently. The data corresponding to frames $W_6$, $W_7$, $W_8$, $W_9$ and $W_{10}$ is read out 7 frames after the reading of $W_{10}$ and the data corresponding to frames $W_{11}$, $W_{12}$, $W_{13}$ and $W_{14}$ is read out 14 frames after $W_{10}$. Such functions can be easily effected by controlling the memory address. And such address control is carried out by a memory addressing and track designating circuit 20 and the controller circuit 10c within the distributor circuit 10'. Thus, it is possible to reduce the entire circuit size by using one unit of memory as compared with providing individual delay circuits for respective tracks.

FIG. 8 shows an example of the memory addressing and track designating circuit 20 shown in FIG. 7. The memory addressing and track designating circuit 20 includes a write addressing circuit 21, a read addressing circuit 22, a frame delaying ROM 27, an adder 28, a selector circuit 30 and a track selection decoder 29. The write addressing circuit 21 and the read addressing circuit 22 each have an input connected to the output of the controller circuit 10c and include a track selection counter 23 or 25 and a word selection counter 24 or 26. The operation of the above-described circuits will be described hereafter. By the write addressing operation, the data signals sent out from the A/D converter 7 alternately for the left channel (L) and right channel (R) and error correction codes P and Q which are generated by the correction code generating circuit for 12 data words are successively written into a memory location within the memory 16 having the address specified by the write addressing circuit 21. At this time, the track selection counter 23 counts the write signal to designate a memory area associated with a track. The word selection counter 24 counts the number of full counting in the track selection counter 23. Therefore, the data shown in FIG. 6 is successively written into the memory 16 in the order of $L_n$, $R_n$, ... $P_n$, $Q_n$, $L_{6+n}$ and $R_{6+n}$. On the other hand, the read addressing circuit 22 is also comprised of the track selection counter 25 and the word selection counter 26 similarly as the write addressing circuit 21. In the read addressing operation, an address signal is obtained by adding a prescribed fixed value stored in the frame delaying ROM 27 to the counted value of the word selection counter 26 through the adder 28. This addition is carried out for providing a particular delay associated with each track. As seen in FIG. 5, the above-described fixed values stored in the frame delaying ROM 27 are O for frames $W_{11}$, $W_{12}$, $W_{13}$ and $W_{14}$, 7 frames for frams $W_6$, $W_7$, $W_8$, $W_9$ and $W_{10}$, and 14 frames for frames $W_1$, $W_2$, $W_3$, $W_4$ and $W_5$. The frame delaying ROM 27 and the track selection decoder 29 are controlled by the outputs of the track selection counter 25. The track selection decoder 29 generates a track selection signal designating a track to which the data read out from the memory 16 is to be assigned. In this way, the frame delaying operation can be accomplished by changing the order of the read address from that of the write address for the memory 16. The selector 30 also designates either a write or read operation for the memory 16. The track selection decoder 29 which is equivalent to the decoder 10b shown in FIG. 4 provides the gate circuit 10a with a signal designating a recording track for the data read out from the memory 16. The memory RAM 16 may also be used as a data interleave RAM.

FIG. 9 shows the entire block diagram of a multihead PCM recorder according to the present invention. Since the circuit constitution of the recording side in FIG. 9 is identical with the circuit shown in FIG. 7, the reproducing circuit will be described hereafter. The signal recorded on the magnetic tape 1 is reproduced by the multitrack reproducing head 37. Then, the signal is waveform-equalized in a reproducing amplifier 38 and separated as waveform-shaped digital data in a data separator circuit 39. Subsequently, errors in each frame within this data, if any, are detected by an error detection circuit 40. Then, the signals from respective tracks are successivley switched by a multiplexer 41 to be written into a de-interleave memory 43 including a RAM. When all of the frames composing one data block, for example the frames $W_1$ to $W_{14}$ in the case of reproduction for the recording format shown i FIG. 5 and FIG. 6, have been written into the memory 13, this data is read out and subjected to error correction in an error correction circuit 44. A timing controller circuit 42, which has a similar function as that of the controller circuit 10c placed in the recording side, controls the operation timing for the multiplexer 41, memory 43, and error correction circuit 44. The timing controller circuit 42 also specifies the memory read address when the memory contents are read out so that the continuous data may be read out in the order of $W_1$ to $W_{14}$. The output data of the error correction circuit is converted into analog signals by a D/A converter 45 and is split into the left and right channels by sample and hold circuits 46L and 46R used as deglitchers, thus the same signal as the input signal is obtained.

We claim:

1. A PCM tape recording and reproducing apparatus wherein an input analog signal is converted into digital data in serial form, said digital data being divided into frames, each frame containing a plurality of data words and an error detection word, and a given number of frames in series forming a group for error correction and being interleaved to be recorded on a plurality of tracks of a magnetic tape through multi-track heads in a matrix of columns and rows, said rows corresponding to the tape tracks, said digital data recorded on the magnetic tape being picked up through reproducing multi-track heads and thereafter being de-interleaved and converted into an analog signal to reproduce said input analog signal, said apparatus comprising:

on the recording side,
(a) track-selecting and frame-forming means for forming a series of input digital data composed of words having a prescribed number of bits into a series frames and for selecting a respective one of said plurality of tracks for receipt of each of the series frames in such a manner that adjacent ones of said series frames of the same group are located at least one track width apart from each other in the track width direction on said plurality of tracks of said magnetic tape;
(b) means for delaying sets of consecutive ones of said series frames of the same group, as assigned to said respective tracks by respectively different amounts relative to the track-length direction so that different columns containing frames of the same group are at least one column apart from each other on the tape tracks and for recording respective series frames thus dispersely arranged on said tape; and on the reproducing side (c) means for rearranging data picked up in parallel from said tracks on said magnetic tape by de-interleaving so as to produce said series data frames.

2. A PCM recorder wherein an input analog signal is converted into digital data in serial form, said digital data being divided into frames, each frame containing a plurality of data words and an error detection word, and a given number of frames in series forming a group for error correction and being interleaved to be recorded on a plurality of tracks of a magnetic tape through multi-track heads in a matrix of columns and rows, said rows corresponding to the tape tracks, said apparatus comprising:

(a) distributor means for distributing each of said frames to a respective one of said plurality of tracks so that adjacent frames of the same group are at least one track width apart from each other in the track width direction on the tracks of the tape; and (b) delay means for delaying sets of consecutive ones of said frames as distributed to said respective tracks by respectively different amounts relative to the track length direction so that different columns containing frames of the same group are at least one column apart from each other.

3. A PCM tape recorder according to claim 1 or 2, wherein said delay means comprises random-access-memory (RAM) means for storing said continuous input data; memory addressing means including counters for controlling a read/write address of said RAM means; and means for altering the read sequence for stored frames periodically.

* * * * *